United States Patent [19]

Beller

[11] Patent Number: 4,968,880
[45] Date of Patent: Nov. 6, 1990

[54] METHOD AND APPARATUS FOR PERFORMING OPTICAL TIME DOMAIN REFLECTOMETRY

[75] Inventor: Josef Beller, Reutlingen, Fed. Rep. of Germany

[73] Assignee: Hewlett-Packard Company, Palo Alto, Calif.

[21] Appl. No.: 461,043

[22] Filed: Jan. 4, 1990

[30] Foreign Application Priority Data

Jan. 24, 1989 [EP] European Pat. Off. ........ 89101168.6

[51] Int. Cl.⁵ ........................... H01J 5/16; H01J 40/14
[52] U.S. Cl. .............................. 250/227.21; 356/73.1
[58] Field of Search ........................... 250/227.21, 226; 324/58 B, 58.5 B, 532–535; 356/73.1

[56] References Cited

U.S. PATENT DOCUMENTS 4,743,753  5/1988  Cheng et al. .................. 250/227.21
4,812,038  3/1989  Nazarathy et al. ............... 356/73.1

FOREIGN PATENT DOCUMENTS

0269448  1/1988  European Pat. Off. .
258843    9/1988  European Pat. Off. .
8707014  11/1987  United Kingdom .

Primary Examiner—David C. Nelms
Assistant Examiner—Stephone B. Allen
Attorney, Agent, or Firm—Woodcock Washburn Kurtz Mackiewicz & Norris

[57] ABSTRACT

In a method and a corresponding apparatus for performing optical time domain reflectometry predetermined time sequences of light signals (A', B') are injected into an optical fiber and the signals backscattered from the fiber are correlated with the injected sequences. The injected time sequences are selected according to a specific code such that after each element in the code represented by "1" or "−1", a predetermined number of elements represented by "0" is provided. Depending on the number of inserted "0"s after each "1" or "−1", sidelobes in the correlation product appear at certain predictable positions. By choosing the numbers of inserted "0"s differently for different injections, the resulting sidelobes appear at different positions in the corresponding correlation products. From the correlation products of such different injections, a composite fiber response can be derived wherein sidelobes are substantially eliminated. The codes used can be derived, for example, from Golay complementary codes.

10 Claims, 6 Drawing Sheets

METHOD AND APPARATUS FOR PERFORMING OPTICAL TIME DOMAIN REFLECTOMETRY

FIELD OF THE INVENTION

The invention relates to a method and apparatus for performing optical time domain reflectometry. Such a method can, for example, be used in optical fiber testing to determine faults and losses in a fiber under test.

BACKGROUND

A method and corresponding apparatus for performing optical time domain reflectometry is disclosed in EP-A-No. 0 269 448. According to the known optical time domain reflectometer (OTDR), sequences of light pulses are injected into an optical fiber and the backscattered light pulses are correlated with the injected sequences of light pulses to generate a representation of the amplitude of the backscattered signal as a function of the time elapsed since the injection of the sequence or as a function of the distance from the input end of the fiber. The pulse sequences injected into the fiber are, for example, complementary pseudorandom sequences such as sequences in accordance with Golay codes. A pair of complementary sequences A and B have the property that the autocorrelation product of A has sidelobes which are complementary to the sidelobes of the autocorrelation product of B; i.e., sidelobes which are located at the same point in the time spectrum and which have amplitudes of equal magnitudes, respectively, but of opposite sign. Consequently, if the correlation products corresponding to the complementary sequences are superposed, the sidelobes cancel, and there remains only signals indicative of actual reflections in the fiber. Ideally, the superposed correlation products of the injected complementary pulse sequences with the signals reflected from distinct discontinuities in the fiber, such as fractures, are a single sharp peak or delta function. The use of complementary pulse sequences provides a better signal-to-noise ratio than conventional reflectometry wherein only a single pulse is injected into the fiber and the reflection of this particular pulse is detected.

In practice, the sidelobe cancellation is not perfect because of the non-ideal characteristics of the signal processing circuitry. For example, saturation of electronic components, such as a receiver or analog-to-digital converter, due to strong power levels of the reflected signal can lead to non-linearities which destroy the complementary nature of the correlation products. As a consequence, correlation sidelobes may appear on the measured backscatter curve that are large enough to distort or even mask a large reflection peak.

SUMMARY OF THE INVENTION

It is an object of this invention to provide a method and corresponding apparatus for performing optical time domain reflectometry on a light transmitting medium which avoids the disadvantages caused by the above-mentioned non-linearities.

According to the invention, at least two different time sequences of light signals are injected into the light transmitting medium and afterwards correlated with the reflected signals from the medium. The different injected time sequences can be described as being derived from a common basic sequence by insertion of a predetermined number of light signals of zero power level after each light signal of the basic sequence.

In one embodiment of the invention, if the basic sequence is represented by a sequence of "+1" and "−1", the injected time sequences can be described as being derived from the basic sequence by insertion of a predetermined number of "0"s after each "+1" or "−1". The different injected time sequences differ from each other by the number of light signals inserted after each light signal of the basic sequence, i.e., by the number of "0"s inserted after each "+1" or "−1". Thus, a first injected sequence according to the invention is obtained by inserting a first number m of "0"s after each "+1" and "−1" of the basic sequence, and a second injected sequence is obtained by inserting a second number n of "0"s after each "+1" and "−1" of the basic sequence.

The insertion of a predetermined number of light signals of zero power level has the important effect that sidelobes in the correlation result of the backscattered signals with the injected sequences appear at well-defined, predictable positions. By selecting different numbers of inserted light signals for different sequences of injected light signals, the sidelobe positions in the backscatter spectrum can be varied. Thus, if a data value obtained during a first injection is obscured by a sidelobe, the true sample value, unaffected by sidelobes, can be obtained by injecting a second sequence with a different number of inserted light signals such that the resulting sidelobe is not at the position of the sample value. In this way, a backscatter spectrum can be composed which is substantially free of sidelobes.

According to an embodiment of the invention, the time sequences of light signals injected into the light transmitting medium are derived from complementary sequences, for example Golay complementary sequences, or generally from pseudorandom sequences. The sequences according to the invention can be understood as modified conventional sequences, whereby the modification relative to conventional Golay or pseudorandom sequences consists in that a predetermined number of light signals of zero power level is inserted after each light signal of the conventional sequence. In order to obtain a fiber response curve that permits the determination of faults and losses, the backscattered sequences of light signals are correlated with the injected sequences.

According to a preferred embodiment of the invention, the overlapping of sidelobes for different injections is avoided by proper selection of the number of inserted "0"s. The number of inserted "0"s increased by one, subsequently called the "extension factor", for a first injection and the extension factor for a second injection are chosen to be prime relative to each other, i.e., non-divisible by each other. By this selection of extension factors, sidelobe overlap is not possible.

DETAILED DESCRIPTION OF THE PREFERRED EMBODIMENT

Figure 1:
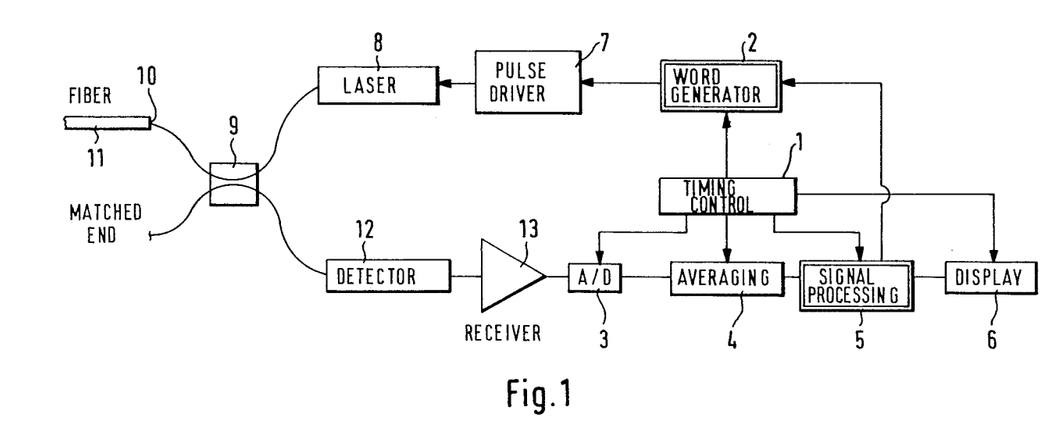
FIG. 1 is a block diagram of apparatus for performing optical time domain reflectometry according to the invention.

FIG. 1 schematically depicts an OTDR according to the invention and an optical fiber 11 under test coupled to the OTDR by an optical coupler 9. The OTDR comprises a timing control circuit 1 which provides timing signals to a word generator 2, to an A/D converter 3, to an averaging circuit 4, to a signal processor 5, and to a display circuit 6. In response to a signal from the timing control circuit 1, the word generator 2 provides a modified complementary code sequence to a pulse drive 7. Further details of the modified complementary code sequence are explained below with reference to FIG. 4.

The electrical pulses provided by the pulse driver 7 are supplied to a light source 8, for example, a laser, for controlling the light output of the light source in accordance with the sequence of electrical pulses. The sequence of light pulses emitted by the laser 8 is injected via a wavebridge 9 such as a 3 dB coupler to an input end 10 of the optical fiber 11 under test. Each launched sequence of light pulses produces a return signal in the optical fiber which is transmitted through the coupler 9 to a detector 12 which converts the impinging light signals into electrical signals. These electrical signals are amplified in a receiver 13 which also acts as an input buffer for a subsequent analog-to-digital converter 3.

The output signal of the receiver 13 is digitized by the A/D converter 3 and the digitized signals are then supplied to an averaging circuit 4. In the averaging circuit 4, the return signals from successive injections of sequences of light signals are added as digital data in order to average the return signals of these successive injections. In this way, the signal-to-noise ratio is improved.

The averaged results are provided to a signal processor 5 that extracts the fiber impulse response by correlating the return signals with the injected sequences. Further details of this procedure are explained below. The impulse response is then displayed on an output display device 6, for example a CRT.

The correlation method for generating the impulse response is explained in more detail below. First, however, some general explanations regarding optical time domain reflectometry using complementary sequences are given.

The sequences injected into a fiber under test can be described as sequences of "1"s and "−1"s or as digital words having a predetermined number of bits. The number of bits will subsequently be denoted as L. In the following, two complementary Golay code sequences having a length of L bits, respectively, are designated as A (n) and B (n). The argument n indicates that the impulse response is measured at discrete points in time $t = n \cdot T_a$, whereby n is any of the numbers 0, 1, 2, ..., and $T_a$ is the sampling period. Strictly speaking, the notation for a sequence should be $A(n \cdot T_A)$, but in the following, the abbreviated notation A (n) will be used.

The term "complementary" means that the following relationship applies:

$$(A \circledast A) + (B \circledast B) = 2L \cdot \delta(n) \tag{1}$$

whereby $\circledast$ denotes correlation of two sequences, $\delta$ is the delta function, i.e., a sharp peak. The signal backscattered from a fiber in response to an injected signal is a convolution between the injected signal and the fiber impulse response h(n).

When two complementary sequences A(n) and B(n) are injected into a fiber, the backscattered signals $S_A(n)$ and $S_B(n)$ which are detected are a convolution (denoted by the symbol $\circledast$) of the fiber impulse response h(n) and the injected sequences, respectively, i.e., the following equations apply:

$$S_A(n) = h(n) \circledast A(n) \tag{2a}$$

$$S_B(n) = h(n) \circledast B(n) \tag{2b}$$

Correlation of equation (2a) with A(n) and of equation (2b) with B(n) and addition of the two intermediate results yields:

$$\begin{aligned} y(n) &= S_A(n) \circledast A(n) + S_B(n) \circledast B(n) \\ &= (h(n) * A(n)) \circledast A(n) + (h(n) * B(n)) \circledast B(n) \end{aligned} \tag{3}$$

Due to the distributive and associative properties of convolution and correlation the parentheses can be regrouped so that equation (3) can be rewritten as $$\begin{aligned} y(n) &= (A(n) \circledast A(n)) * h(n) + (B(n) \circledast B(n)) * h(n) \\ &= (A(n) \circledast A(n)) + (B(n) \circledast B(n)) * h(n) \end{aligned} \tag{4}$$

Using the autocorrelation property according to equation (1), and the known result that the convolution of an impulse response and a delta function is equal to the impulse response, the final result is then $$y(n) = h(n) * 2L\delta(n) = 2L \cdot h(n) \tag{5}$$

As can be seen from equation (5) the reconstructed response is 2L times larger than the response to a digital impulse. From this it becomes clear that reflectometry using sequences of injected light signals with subsequent correlation of the backscattered signals leads to an improvement of the signal-to-noise ratio as compared with single pulse reflectometry without impairing the resolution.

The foregoing considerations regarding the sequences A(n) and B(n) use an abbreviated notation for these sequences. In practice, since there are no negative light power levels, i.e., a "−1" cannot be realized by light signals, the sequences are split up in two subsequences, respectively. The two subsequences for the A sequence are designated as A+ and A−, whereby A+ is obtained from A by replacing all the "−1"s in A by "0"s and leaving all "1"s unchanged. The subsequence A− is the logical complement of the subsequence A+, i.e., a "1" in the sequence A+ corresponds to a "0" in the subsequence $A^-$ and vice versa. Thus, $A=A^{30}-A^-$. The sequence B is correspondingly split up into two subsequences $B^+$ and $B^-$ such that $B^-$ is the logical complement of $B^+$ and the equation applies: $B=B^+-B^-$.

In a practical measurement situation, the sequences $A^+$ and $A^-$ are successively injected into the fiber under test and the measured backscatter signals are $h(n) \circledast A^+(n)$ and $h(n) \circledast A^-(n)$, respectively. These two expressions are then subtracted from each other to yield the backscatter signal $S_A(n)$ (see the above equation (2a)):

$$S_A(n)=h(n) * A(n)=A^+(n) * h(n)-A^-(n) * h(n).$$

Similarly, the sequences $B^+$ and $B^-$ are successively injected into the fiber and for the backscatter signal $S_B(n)$ (see the above equation (2b)), the following applies:

$$S_B(n)=h(n)*B(n)=B^+(n)*h(n)-B^-(n)*h(n).$$

The splitting-up of the sequences A and B in subsequences $A^+$, $A^-$, and $B^+$, $B^-$ is known in optical time reflectometry, for example from the above mentioned document EP-A-No. 0 269 448 (see in this document, for example, FIG. 8 with accompanying description). In the following, the abbreviated notations $A(n)$ and $B(n)$ for injected sequences will be used, but it is understood that these sequences can be split up in two subsequences, respectively, as described before.

The above considerations resulting in equations (5) are valid for ideal systems which have a linear behavior. In real measurement situations, however, the OTDR can be confronted with an extremely wide range of optical power levels due to strong reflections so that the receiver has difficulties in staying within its range of linear operation. Furthermore, all analog components, such as a laser driver, receiver, buffer-amplifier and analog-to-digital converter have slightly non-linear behavior.

Figure 2:
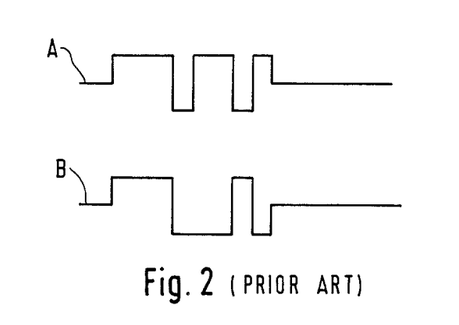
FIG. 2 shows two complementary Golay code sequences A and B as they are used in the prior art.
Figure 3:
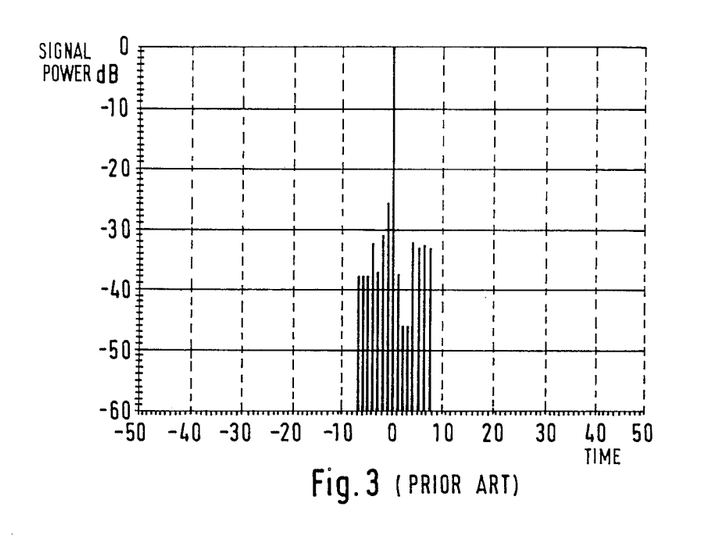
FIG. 3 illustrates the incomplete cancellation of sidelobes due to non-linear behavior in the prior art.

In order to illustrate such non-linear behavior, reference is made to FIGS. 2 and 3 where two complementary Golay code sequences A and B and the resulting summed autocorrelation functions are shown. The complementary sequences A and B in FIG. 2 have a code length of L=8 bits. The sequences shown can thus be represented by the following codes:

Sequence A: 1, 1, 1, −1, 1, 1, −1, 1
Sequence B: 1, 1, 1, −1, −1, −1, 1, −1

The corresponding subsequences would thus be, according to the mentioned construction principle:
A+: 1, 1, 1, 0, 1, 1, 0, 1
A−: 0, 0, 0, 1, 0, 0, 1, 0
B+: 0, 0, 0, 1, 1, 1, 0, 1
B−: 0, 0, 0, 1, 1, 1, 0, 1

FIG. 3 illustrates the incomplete cancellation of sidelobes because of non-linearities. It can be seen that the peak at position 0 is surrounded by sidelobes at positions up to L−1 points apart to the left and to the right. As a consequence thereof, a measured signal will be distorted in the neighborhood of strong reflections. These distortions are substantially eliminated by the present invention.

The basic step to overcome the sidelobe problems is now explained with reference to FIG. 4. The basic idea according to the invention is to modify the conventional code sequences such as the sequences A and B in FIG. 2 by inserting a predetermined number of zero bits between each pair of bits in the sequences A and B. In the example shown in FIG. 4, three additional bits are inserted such that the modified code sequences A′ and B′ have the following form:

Sequence A′: 1,0,0,0,1,0,0,0,1,0,0,0,−1,0,0,0,1,0,0,0,1, 0,0,0,−1,0,0,0,1,0,0,0

Sequence B′: 1,0,0,0,1,0,0,0,1,0,0,0,−1,0,0,0,−1,0,0,0, −1,0,0,0,1,0,0,0,−1,0,0,0

Figure 4:
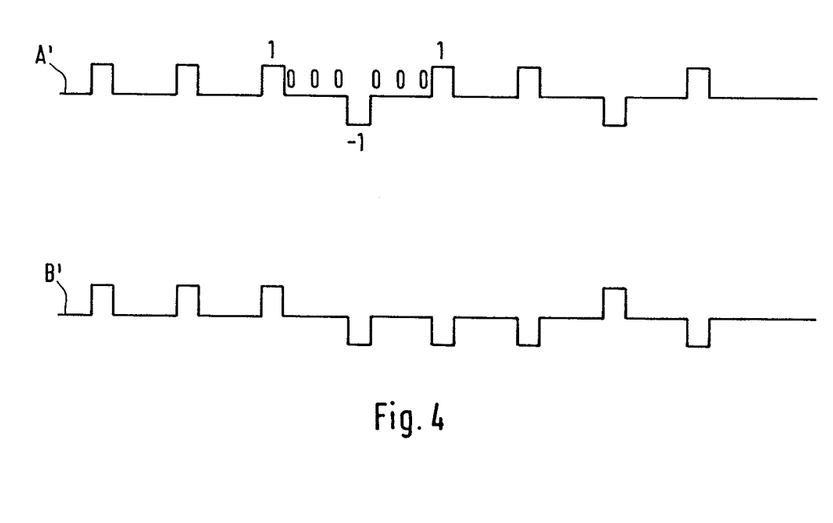
FIG. 4 shows modified complementary Golay code sequences A and B according to an embodiment of the invention.

In FIG. 4, some of the elements ("1", "−1", "−0") of the injected sequence A′ are indicated. It can also be seen from FIG. 4 which depicts the time sequence of injected signals, that the duration of an inserted "0" signal corresponds to the duration of the "1" or "−1" signals. Since three "0" signals are inserted in the example shown, the time interval during which "0" signal is applied is three times as long as the time interval during which a single "1" or "−1" signal is applied.

In practice, the modified sequences are also split up in two subsequences, respectively, which are successively injected into the fiber under test as described above. The subsequences are formed from the modified sequences A′ and B′ according to the above construction principle (replacing "−1" by "0" to obtain A+, and forming the complement of A+ to obtain A−) with the understanding that the inserted "0"s remain unaffected by these two transformations. In other words, the subsequences for the modified sequences A′ and B′ are obtained by inserting the predetermined number of zero bits between each two bits of the subsequences $A^+$, $A^-$, $B^+$, $B^-$ of the unmodified sequences A and B. To give a practical example, the subsequences for the modified sequences A′ and B′ in the above examples are as follows:

A′+:
1,0,0,0,1,0,0,0,1,0,0,0,0,0,0,0,1,0,0,0,1,0,0,0,0,0,0,0, 1,0,0,0

A′−: 0,0,0,0,0,0,0 0,0,0,0,0,1,0,0,0,0,0,0,0,0,0,0,0,1,0,0,0, 0,0,0,0

B′+:
1,0,0,0,1,0,0,0,1,0,0,0,0,0,0,0,0,0,0,0,0,0,0,0,1,0,0,0, 0,0,0,0

B′−:
0,0,0,0,0,0,0,0,0,0,0,0,1,0,0,0,1,0,0,0,1,0,0,0,0,0,0,0, 1,0,0,0

Generally, the number of zero bits inserted between each pair of bits in a conventional sequence is X−1, whereby X is an integer greater than 1 and is called the "extension factor". The modified code sequences A′ and B′ thus have lengths of L=XL. In the example shown in FIG. 4, L is 8 and X is 4.

The calculated sum of the autocorrelation functions $A' \circledast A'$ and $B' \circledast B'$ now has the important property that sidelobes can only appear at positions which are given by the relations:

$$SP=PP \pm iX; \text{ with } i=1,2,3,\ldots,L-1 \quad (6)$$

wherein SP means sidelobe position and PP means peak position. Stated in other words, equation (6) means that all sample values which are positioned a distance of ±D apart from the peak position can never be distorted by sidelobes, wherein D is given by the relationship:

$$D = iX + j; \quad i = 0,1,\ldots,L-2 \quad (7)$$
$$j = 1,2,\ldots,X-1$$

This property of the modified sequences of the invention permits one to generate fiber response curves with sidelobes located at well-defined positions, and the variation of the extension factor X in successive measurements permits one to generate different response curves with sidelobes at different locations, respectively, while the peaks caused by reflections in the fiber remain fixed.

The property expressed in equation (7) can be proven by considering the autocorrelation $z_k = X_k \circledast X_k$ of the modified sequences $X_k$ with $$x_k = \begin{cases} +/- 1 \text{ for } k = iX; i = 0,1,\ldots, L-1 \\ 0 \text{ otherwise} \end{cases} \quad (8)$$

The autocorrelation $z_k$ is defined as $$z_k = \sum_{m=-L'+1}^{L'-1} x_m x_{m+k} = x_k \circledast x_k, \text{ with } L' = XL \quad (9)$$

The term $z_k$ can only be nonzero for $k = \pm i \cdot X$, $i = 0, 1, \ldots, L-1$. In order to reduce computation time it is sufficient to calculate only the terms of the autocorrelation $z_k$ which are not zero. Consequently, the index m in equation (9) could be incremented in steps of X.

According to the invention, modified code sequences are injected into an optical fiber, the return signal is measured and the sum of the individual autocorrelations is computed according to equations (3)-(5). Then, one or several post-processing procedures are employed to get a final result without disturbance either by sidelobes due to inherent non-linearities in analog circuitry nor by sidelobes due to saturation of any circuit component. Three post-processing procedures are described below.

PROCEDURE I

According to this procedure, the fiber is successively probed with modified code sequences $A_i$ and $B_i$ with different extension factors $X_i$, i.e., the number of zero bits inserted is different for different injections. The individual correlation results are then summed up to generate a final result $y_f$. The final result $y_f$ can be written as:

$$y_f = \Sigma y_i \quad (10)$$

where, using equation (4), the following relationship applies:

$$y_i = (A'_i(n) \circledast A'_i(n))^*h(n) + (B'_i(n) \circledast B'_i(n))^*h(n).$$

As explained above, the expressions $A'_i$ and $B'_i$ are abbreviated notions. In fact:

$$A'_i = A'_i{}^+(n) - A'_i{}^-(n) \text{ and } B'_i = B'_i{}^+(n) - B'_i{}^{31}(n).$$

In this final result, the magnitudes of the sidelobes are reduced relative to magnitudes of the peaks caused by reflections in the fiber as compared to the individual correlated results since the peak positions remain the same for different injections while the sidelobe positions vary from injection to injection in accordance with the varying extension factors. In this way, the peak-to-sidelobe ratio is increased. It might happen that the sidelobe positions of successive measurements overlap, i.e., that a sidelobe of a measurement with a first extension factor occurs at the same location as another sidelobe of a measurement with a second extension factor. Such overlap of sidelobes can be avoided by proper selection of the extension factors $X_i$. A convenient way, for example, is to select the extension factors prime to each other, i.e., such that the numbers $X_i$ cannot be divided by each other. In this way, excellent results can be achieved as demonstrated in FIGS. 5a and 5b.

Figure 5A:
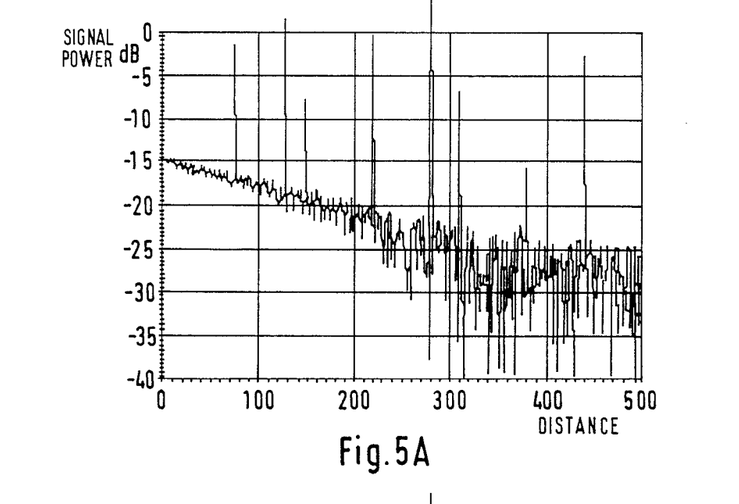
FIG. 5a shows the fiber response curve for injection of a single pulse.
Figure 5B:
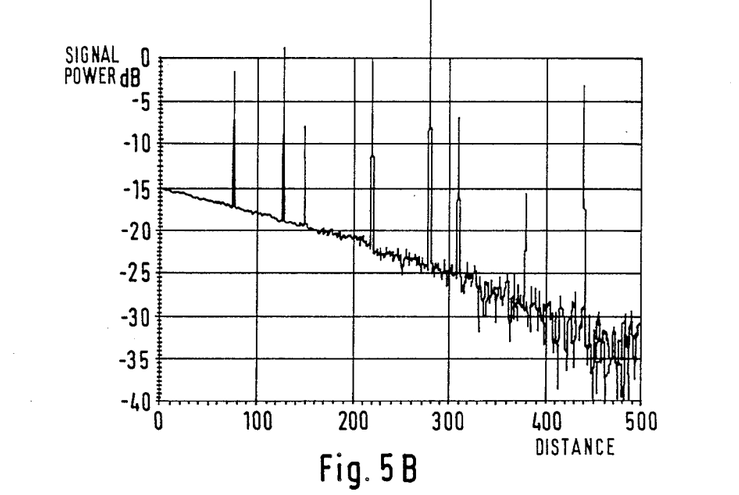
FIG. 5b shows the fiber response curve for injection of modified sequences according to the invention.

FIG. 5a shows the fiber response to a single injected pulse, and FIG. 5b shows the response to a modified 64 bit sequence processed according to the just described procedure. The curves shown in FIGS. 5a and 5b were measured in equivalent measurement times. The improvement achieved by the invention can clearly be seen.

This procedure is preferably used as a first processing step at the beginning of each new measurement for rapidly increasing the signal-to-noise ratio of the fiber response and for roughly determining the positions of reflections. Particularly when using very short pulse widths which, in the prior art would cause a noisy backscattering impulse response, procedure No. I provides the advantage that a quick representation of the fiber response can be obtained, allowing one to perceive general fiber characteristics.

PROCEDURE II

Figure 6:
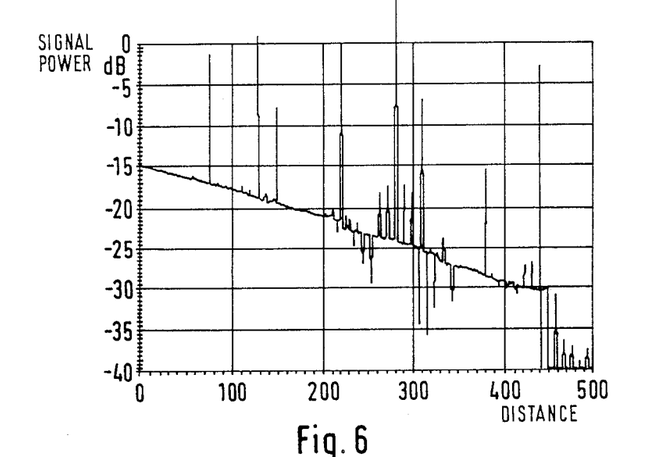
FIG. 6 shows an example of a fiber response curve with peaks corresponding to strong reflections and associated sidelobes.

This procedure is applied if the positions of reflections can be clearly determined and if a slight degradation of the spatial resolution is tolerable. As an example, FIG. 6 shows a typical fiber response with strong reflections causing sidelobes due to a non-linear behavior of transmitter and receiver circuits. The probing signal in this example is a modified Golay code pair of length $L=8$ and with an extension factor $X=9$.

Figure 7A:
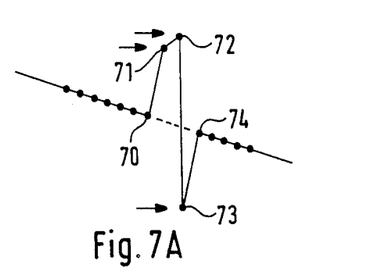
FIGS. 7a and 7b illustrate the substitution of data values at sidelobe positions if no peaks corresponding to a reflection are adjacent.
Figure 7B:
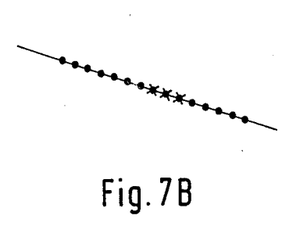

First, all peak positions have to be determined. This can be done quickly (typically within a second) by a premeasurement step using conventional single-pulse reflectometry and subsequent computer evaluation of the measured backscatter data to determine the peak positions. From the peak positions, all possible sidelobe positions can be calculated according to equation (6). Then, according to the procedure, the sample values at the sidelobe positions are replaced by the mean value of the two adjacent sample values. If, however, at least one of the two adjacent data points represents a sidelobe or even a reflection, this point cannot be used for computation of the substitution value. Then, two cases have to be distinguished:

(1.) If two or more sidelobes are arranged adjacent to each other and no reflection borders on this group of sidelobes, each substitution value is calculated as lying on a straight line that connects the two outer non-distorted samples of the fiber response. FIG. 7a shows a detail of the fiber response curve of FIG. 6 and with sidelobes indicated by the sample values of data points 71, 72, and 73. FIG. 7b shows the resulting curve after performing the procedure just described. The sample values 71, 72, and 73 have been replaced by sample values indicated by *'s such that a straight line connecting the two outer non-distorted sample values 70 and 74 is formed.

Figure 8A:
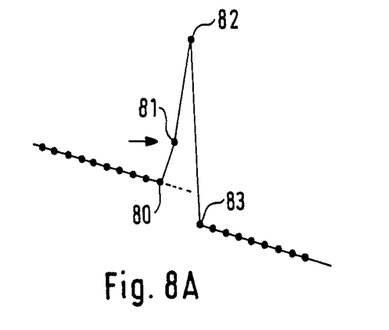
FIGS. 8a and 8b illustrate the substitution of data values at sidelobe positions if a peak corresponding to a reflection is adjacent.
Figure 8B:
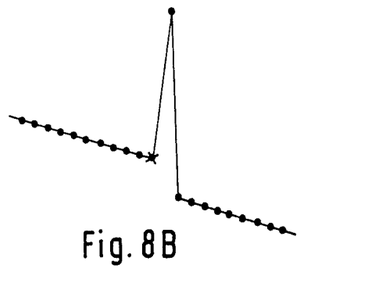
Figure 9:
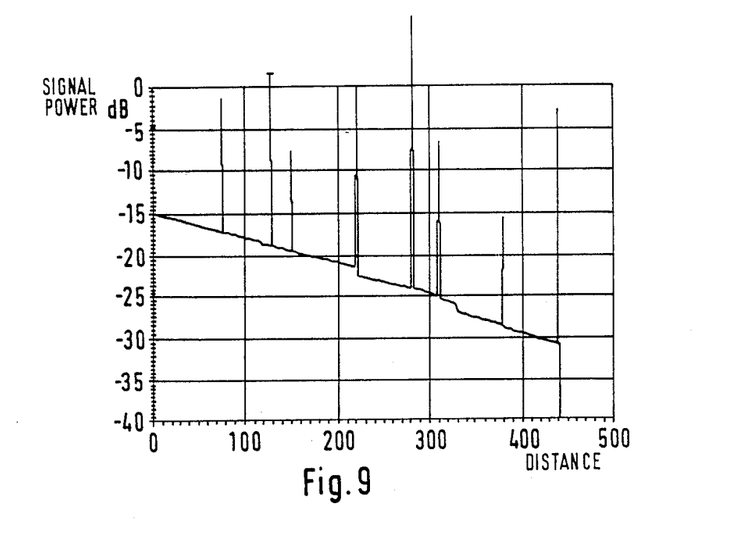
FIG. 9 shows the fiber response curve after substitution of data values at sidelobe positions.

(2.) If a reflection is located adjacent to a sidelobe, then the sample value at the sidelobe position is calculated by a straight line approximation as illustrated in FIG. 8. In FIG. 8a, the sidelobe position is at 81 and the peak position is at 82. The approximation is performed such that a straight line is extended from the left across the undisturbed sample point 80 as indicated by the dotted line in FIG. 8a. The sample value on the other side of the reflection peak cannot be used since in most cases a reflection is followed by a splice or other discontinuity. The result of the approximation is shown in FIG. 8b. Generally, a dense concentration of sidelobes can be avoided by choosing an extension factor X which is great enough. FIG. 9 shows the result after application of procedure II to the data in FIG. 6.

PROCEDURE III

After application of procedure I and/or II, procedure III serves for further sidelobe cancellation. The key step of this procedure is to substitute all disturbed sample values at sidelobe positions by "correct" values from earlier measurement results. For that purpose, the fiber is successively probed, as in procedure I, with modified code sequences with different extension factors.

In order to obtain a good noise reduction for all samples during the whole measurement process, multiple overlap of sidelobe positions in successive measurements has to be avoided. The only parameter that affects the sidelobe positions is the extension factor X. All chosen extension factors should be prime relative to each other, i.e., the extension factors should not be divisible by one another.

Each of the three described procedures or a combination of these procedures offers the possibility of improving the sidelobe to peak ratio or even to eliminate sidelobes that may appear in nonlinear systems.

According to an embodiment of the invention, a corresponding apparatus for performing optical time domain reflectometry comprises a memory of 4 k words allowing 2000 data points for representing the fiber impulse curve, and a code length of the modified Golay codes A' or B' of up to 1000 bits, respectively. Therefore, during each measurement the following condition should be met:

$$L' = X \cdot L < 1000 \qquad (11)$$

where L' is the number of bits of the modified sequence and L is the number of bits of the unmodified sequence. The extension factor varies in the range from three to ten times the number R of strong reflections in the fiber. Consequently, the maximum usable code length L is given by the relationship:

$$\frac{1000}{10 \cdot R} < L < \frac{1000}{3 \cdot R} \qquad (12)$$

For example, if 9 strong reflections have been detected in a measurement, i.e., if R=9, then X will be varied between 27 and 90. But only numbers which are prime relative to each other are used. In order to achieve the optimum signal-to-noise ratio, the code length is determined according to equation (12). In the present example, the maximum code length determined according to equation (12) would be a number between 11 and 37. Since L has to be a power of 2, the possible code lengths would thus be 2, 4, 8, 16, or 32, depending on the extension factor X. Preferably, the longer code lengths 8, 16, or 32 are used since they give better results than the shorter code lengths (2 or 4).

The above embodiment of the invention has been described in connection with complementary sequences such as Golay complementary sequences. It is understood, however, that the invention is not limited to such sequences. The invention can also be used in connection with non-complementary sequences, i.e., pseudorandom sequences which do not have the property of sidelobe cancellation (in the ideal case when non-linearities are not a problem). In such cases, the variation of the extension factors for different injections into the light transmitting medium also permits one to derive a fiber response curve in which unwanted sidelobes are substantially reduced or even completely missing. Thereby, sidelobes due to the non-complementary nature of the used sequences or due to non-linearities in the measuring system can be reduced or avoided. If, for example, a data value obtained during a first injection is obscured by a sidelobe, the true sample value which is unaffected by sidelobes can be obtained by injecting at least one other sequence with a different extension factor such that the sidelobe for this injection is at a different position.

Although a particular embodiment of the invention has been shown and described and other embodiments and modifications have been suggested, still other embodiments and modifications will occur to those of or ordinary skill in the art which will fall within the true spirit and scope of the appended claims.

I claim:
1. A method of performing optical time domain reflectometry on a light transmitting medium, the method comprising the following steps:
    (a) injecting at least two different time sequences of light signals into the medium, comprising light signals of two different power levels, wherein said different time sequences are derived from a common basic sequence by insertion of a predetermined number of light signals of the same power level after each light signal of the basic sequence, and with the different time sequences differing from each other by the number (X−1) of the inserted light signals
    (b) detecting the light signals reflected from the light transmitting medium, and
    (c) correlating the detected signals from the light transmitting medium with the injected signals.
2. Method according to claim 1, wherein the common basic sequence comprises a set of complementary sequences.
3. Method according to claim 2, further comprising:
    successively injecting a plurality of complementary sequences into the light transmitting medium with the number (X−1) of inserted light signals being different from each other for different injections, and
    superposing the correlation results of the individual injections for generating a composite measurement result, thereby reducing the magnitudes of sidelobes relative to the magnitudes of peaks originating from reflections in the light transmitting medium.
4. Method according to claim 2 or 3, further comprising:
    determining the positions of peaks originating from reflections in the light transmitting medium, and
    calculating all possible sidelobe positions according to the equation

$$SP = PP \pm iX;$$

wherein SP denotes the sidelobe positions, PP denotes the peak positions, and i may be any integer from 1 to L−1, L being the length of the basic sequence, and replacing measured data values at sidelobe positions by calculated data values such that the calculated data values approximate adjacent sample values.

5. Method according to claim 2 or 3, further comprising:
   selecting the number (X−1) of inserted light signals such that the sidelobe positions for different injections do not overlap, and
   replacing data values representing distortions by sidelobes by sample values from another injection wherein the sample values at the sidelobe positions are not disturbed, thereby obtaining sample values which are substantially free of distortions by sidelobes.

6. Method according to claim 2, further comprising:
   successively injecting a plurality of complementary sequences into the light transmitting medium with the number (X−1) of inserted light signals being different from each other for different injections, and
   superposing the correlation results of the individual injections, thereby generating a composite measurement result and reducing the magnitudes of sidelobes relative to the magnitudes of peaks originating from reflections in the light transmitting medium,
   wherein the numbers X for different injections are prime relative to each other.

7. Method according to claim 2 or 3, further comprising:
   selecting the number (X−1) of inserted light signals such that the sidelobe positions for different injections do not overlap, and
   replacing data values representing distortions by sidelobes by sample values from another injection wherein the sample values at the sidelobe positions are not disturbed, thereby obtaining sample values which are substantially free of distortions by sidelobes,
   wherein the numbers X are prime relative to each other.

8. Method according to claim 1, wherein the common basic sequence comprise complementary sequences, and further comprising:
   successively injecting a plurality of complementary sequences into the light transmitting medium with the number (X−1) of inserted light signals being different from each other for different injections;
   superposing the correlation results of the individual injections thereby generating a composite measurement result and reducing the magnitudes of sidelobes relative to the magnitudes of peaks originating from reflections in the light transmitting medium;
   determining the positions of peaks originating from reflections in the light transmitting medium;
   calculating all possible sidelobe positions according to the equation $$SP = PP \pm iX;$$

wherein SP denotes the sidelobe positions, PP denotes the peak positions, and i may be any integer from 1 to L−1, L being the length of the basic sequences, and
   replacing measured data values at sidelobe positions by calculated data values such that the calculated data values approximate adjacent sample values;
   selecting the number (X−1) of inserted light signals such that the sidelobe positions for different injections do not overlap; and
   replacing data values representing distortions by sidelobes by sample values from another injection wherein the sample values at the sidelobe positions are not disturbed, thereby obtaining sample values which are substantially free of distortions by sidelobes.

9. Method according to claim 1, wherein the common basic sequences comprise complementary sequences, and further comprising:
   determining the positions of peaks originating from reflections in the light transmitting medium;
   calculating all possible sidelobe positions according to the equation $$SP = PP \pm iX;$$

wherein SP denotes the sidelobe positions, PP denotes the peak positions, and i may be any integer from 1 to L−1, L being the length of the basic sequences;
   replacing measured data values at sidelobe positions by calculated data values such that the calculated data values approximate adjacent sample values;
   selecting the number (X−1) of inserted light signals such that the sidelobe positions for different injections do not overlap; and
   replacing data values representing distortions by sidelobes by sample values from another injection wherein the sample values at the sidelobe positions are not disturbed, thereby obtaining sample values which are substantially free of distortions by sidelobes.

10. Apparatus for performing optical time domain reflectometry on a light transmitting medium, comprising:
    light injection means for injecting a predetermined time sequence of light signals into the medium,
    a word generator connected to the light injection means for generating sequences of electrical pulses for activating the light injection means such that at least two different time sequences of light signals are injected into the light transmitting medium, with the different sequences being derived from a common basic sequence by insertion of a predetermined number of light signals of the same power level after each light signal of the basic sequence, and with the different time sequences differing from each other by the number (X−1) of the inserted light signals,
    detection means for detecting the light signals reflected from the light transmitting medium, signal processing means for correlating the detected signals from the light transmitting medium with the injected signals, and
    display means for displaying the correlated results.

* * * * *

UNITED STATES PATENT AND TRADEMARK OFFICE
CERTIFICATE OF CORRECTION

PATENT NO. : 4,968,880
DATED : November 6, 1990
INVENTOR(S) : Josef Beller It is certified that error appears in the above-identified patent and that said Letters Patent is hereby corrected as shown below:

Col. 5, line 1, After "Thus," instead of "$A = A^{30} - A^{\cdot}$", the equation should be -- $A = A^{+} - A^{-}$ --;

line 53, "$B^{+}$:0,0,0,1,1,1,0,1" should read -- $B^{+}$:1,1,1,0,0,0,1,0 --

Col. 6, lines 37 and 38, should read
-- $A'^{-}$: 0,0,0,0,0,0,0,0,0,0,0,0,1,0,0,0, 0,0,0,0,0,0,0,0,1,0,0,0,0,0,0,0 --

Col. 7, line 45, "$Y_{f} = \Sigma Y_{i}$" should read -- $Y_{F} = \Sigma_{i} Y_{i}$ --;

line 52, "notions" should read -- notations --;

line 54, the first factor of the equation "$A'_{ii}$" should read -- $A'_{i}$ --; and the last factor of the equation "$B'^{31}_{i}(n)$" should read -- $B'^{-}_{i}(n)$ --

Signed and Sealed this

Fifth Day of July, 1994

Attest:

BRUCE LEHMAN

*Attesting Officer*     *Commissioner of Patents and Trademarks*